(12) United States Patent
Miettinen et al.

(10) Patent No.: US 8,755,322 B2
(45) Date of Patent: Jun. 17, 2014

(54) METHOD, APPARATUS, AND COMPUTER PROGRAM PRODUCT FOR PROVIDING INTERNET PROTOCOL MULTICAST TRANSPORT

(75) Inventors: Natalia Miettinen, Espoo (FI); Roman Pichna, Espoo (FI)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 12/989,597

(22) PCT Filed: Apr. 23, 2009

(86) PCT No.: PCT/IB2009/005365
§ 371 (c)(1),
(2), (4) Date: Oct. 25, 2010

(87) PCT Pub. No.: WO2009/130589
PCT Pub. Date: Oct. 29, 2009

(65) Prior Publication Data
US 2011/0044232 A1    Feb. 24, 2011

Related U.S. Application Data

(60) Provisional application No. 61/047,447, filed on Apr. 24, 2008.

(51) Int. Cl.
*H04H 20/71*    (2008.01)
(52) U.S. Cl.
USPC .......................................... 370/312
(58) Field of Classification Search
CPC ..... H04W 84/18; H04W 84/12; H04W 88/08; H04W 4/06; H04W 80/04; H04L 2012/5608; H04L 45/16; H04B 7/2606
USPC ............. 370/312, 310, 310.2, 315, 328, 331, 370/338, 389, 390, 432, 473
See application file for complete search history.

(56) References Cited

U.S. PATENT DOCUMENTS 6,766,372 B1 *   7/2004   Stern .............................. 709/227
7,113,581 B2 *   9/2006   Benedyk et al. ............... 379/219
(Continued)

FOREIGN PATENT DOCUMENTS

| | | |
|---|---|---|
| CN | 10-1022333 A | 8/2007 |
| EP | 1919124 A2 * | 5/2008 |
| WO | 2008093208 A1 | 8/2008 |

OTHER PUBLICATIONS

International Search Report and Written Opinion of the International Searching Authority received from PCT Application No. PCT/IB2009/005365, dated Jul. 22, 2009, 12 pages.

(Continued)

*Primary Examiner* — Anh Ngoc Nguyen
(74) *Attorney, Agent, or Firm* — Alston & Bird LLP

(57) ABSTRACT

An apparatus for providing IP multicast transport may include a processor and a memory. The memory may store executable instructions that in response to execution by the processor cause the apparatus to at least perform operations including receiving a key for encapsulation of multicast data at a base station, using the key to generate a response to a message indicative of a multicast connection for a particular service received from a gateway device, the base station being joined to a same multicast tree in a multicast-broadcast zone as the gateway device, and establishing the multicast connection with the gateway device via a multicast data path comprising a multicast tunnel associated with the key. Corresponding methods and computer program products are also provided.

10 Claims, 9 Drawing Sheets

(56) References Cited

U.S. PATENT DOCUMENTS

| | | | | |
|---|---|---|---|---|
| 7,590,120 | B2* | 9/2009 | Shuen et al. | 370/392 |
| 7,684,335 | B2* | 3/2010 | Chen | 370/236 |
| 7,715,389 | B2 | 5/2010 | Pichna et al. | |
| 7,903,540 | B2* | 3/2011 | Shousterman et al. | 370/216 |
| 2002/0104001 | A1 | 8/2002 | Lotspiech et al. | |
| 2007/0220573 | A1 | 9/2007 | Chiussi et al. | |
| 2008/0123645 | A1 | 5/2008 | Pichna et al. | |
| 2009/0292914 | A1 | 11/2009 | Liu et al. | |

OTHER PUBLICATIONS

Lee et al., "A MAC Multicasting Approach for WiMAX Access Networks", Sixth Annual IEEE International Conference on Pervasive Computing and Communications, IEEE Piscataway, NJ, USA, Mar. 17, 2008, pp. 348-353.

Office Action for Chinese Application No. 200980114326.4 dated Nov. 28, 2012.

* cited by examiner

METHOD, APPARATUS, AND COMPUTER PROGRAM PRODUCT FOR PROVIDING INTERNET PROTOCOL MULTICAST TRANSPORT

RELATED APPLICATION

This application was originally filed as PCT Application No. PCT/IB2009/005365 filed Apr. 23, 2009, which claims priority benefit from U.S. Provisional Application No. 61/047,447, filed Apr. 24, 2008.

TECHNOLOGICAL FIELD

Embodiments of the present invention relate generally to network communication technology and, more particularly, relate to a method, apparatus and computer program product for providing Internet Protocol (IP) multicast transport for use in an access service network (ASN) such as, for example, a WiMAX ASN.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One such delivery technique that has shown promise is Digital Video Broadcasting (DVB). In this regard, DVB-T, which is related to DVB-C (cable) and DVB-S (satellite), is the terrestrial variant of the DVB standard. As is well known, DVB-T is a wireless point-to-multipoint data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain. On the other hand, DVB-H (handheld), which is also related to DVB-T, can provide increased performance particularly for wireless data delivery to handheld devices.

As evidenced by DVB, digital broadband data broadcast networks are known. In this regard DVB networks enjoy popularity in Europe and elsewhere for the delivery of television content as well as the delivery of other data, such as Internet Protocol (IP) data. Other examples of broadband data broadcast networks include Japanese Terrestrial Integrated Service Digital Broadcasting (ISDB-T), Digital Audio Broadcasting (DAB), and Multimedia Broadcast Multicast Service (3GPP MBMS, 3GPP2 BCMCS), and those networks provided by the Advanced Television Systems Committee (ATSC).

In many such systems, program guides have been developed to deliver services to users over the digital broadband data broadcast networks. Multicast and Broadcast Service (MCBCS) allows users to receive a variety of content (e.g. video/text) via mobile terminals in a wireless network. Other similar services are being developed for Third Generation Partnership Project (3GPP) and Open Mobile Alliance (OMA), for example. Users may subscribe to MCBCS service, in which a controller responds to user requests for content information over an IP network. A user selects desired content via the MCBCS program guide at their mobile terminals. The controller may then authenticate the user's request and provide the selected content if appropriately authenticated.

Meanwhile, WiMAX (Worldwide Interoperability for Microwave Access), is an exemplary telecommunications technology that has been developed for providing communication of wireless data over long distances in a variety of ways, such as point-to-point links or full mobile cellular type access. WiMAX is based on the IEEE (Institute of Electrical and Electronics Engineers) 802.16 standard. WiMAX is generally touted as enabling the delivery of last mile wireless broadband access as an alternative to cable and DSL (digital subscriber line). WiMAX may be an alternative means of increasing bandwidth for a variety of data-intensive applications such as digital video broadcasting (DVB). As such, for example, efforts have been made to provide broadcast support for WiMAX technology.

In WiMAX architecture, a wireless ASN may be coupled to base stations that wirelessly communicate data to mobile terminals via an ASN gateway (ASN-GW). FIG. 1 illustrates a conventional ASN architecture using IP unicast transport for the logical interconnection between the ASN-GW and base stations. Thus, the "last hop" to the base stations is handled via unicast. The communication interface between a ASN-GW and a base station (BS) is typically referred to as the R6 interface (e.g., a reference point between BS and ASN). As shown in FIG. 1, the R6 interface is conventionally provided as a unicast IP transport mechanism. As such, the R6 interface as well as the R4 interface (which defines a reference point between ASN and other ASNs for mobility across ASNs) may be crossed by a user plane that is transported inside a tunnel. The tunnel is typically a generic routing encapsulation (GRE) tunnel.

For MCBCS, the architecture of FIG. 1 may be considered inefficient since the last hop transport link to the BS may carry identical and synchronized data flow to various base station sectors (e.g., BS1, BS2, BS3, etc.) in a MCBCS zone. Thus, if there are several sectors per site, or if the transport to the base stations is daisy-chained as shown in FIG. 1, the flows via unicast may mean that identical packets are sent over the last hop transport in several independent and synchronized copies resulting in inefficient usage of resources.

Accordingly, it may be desirable to provide an improved mechanism for providing last hop transport links in an ASN.

BRIEF SUMMARY

A method, apparatus and computer program product are therefore provided for enabling the provision of IP multicast flows in an ASN such as a mobile WiMAX ASN. Thus, it may be possible to improve efficiency in relation to network resources for such use cases as MCBCS.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
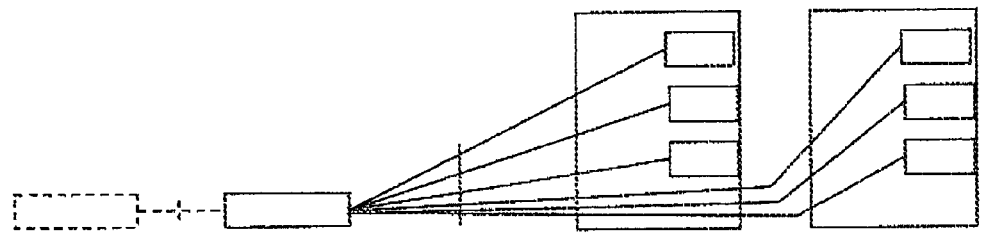
FIG. 1 is a schematic block diagram of an access service network.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Figure 2:
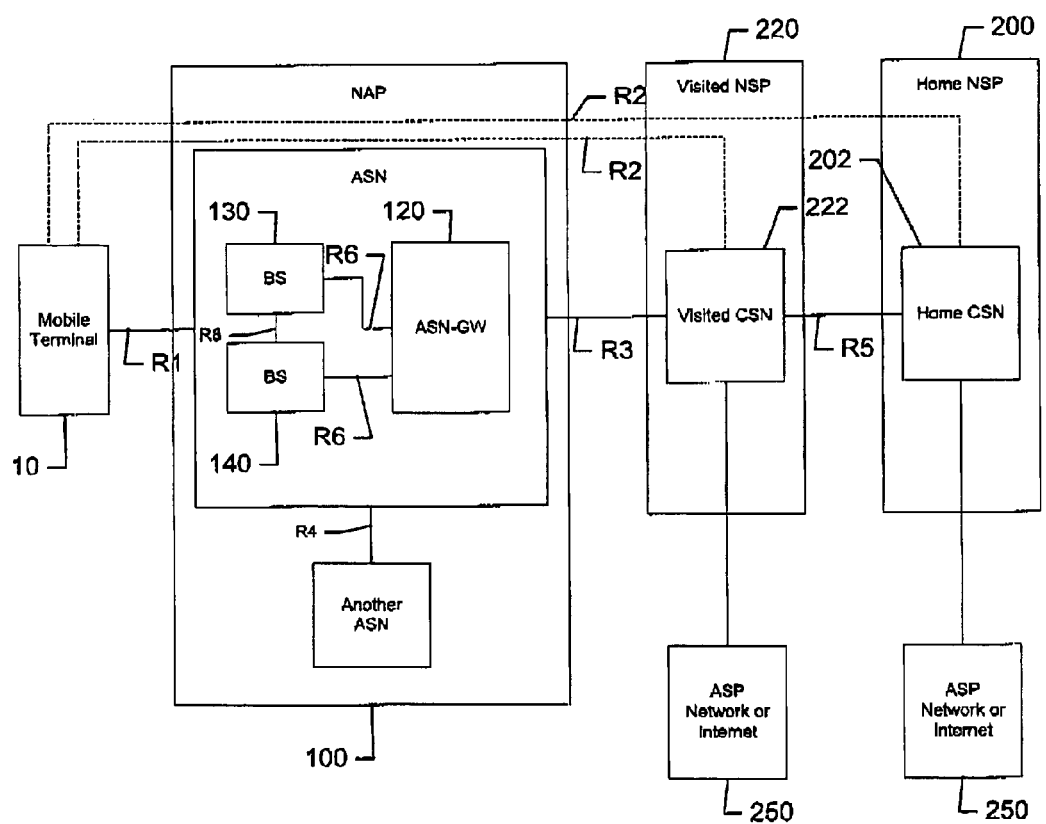
FIG. 2 is a schematic block diagram of a WiMAX system architecture according to an exemplary embodiment of the present invention.

FIG. 2 is a schematic block diagram of a WiMAX system architecture according to an exemplary embodiment of the present invention. In this regard, as shown in FIG. 2, a WiMAX system, which is exemplary of one communication system in connection with which embodiments of the present invention may be employed, may include a mobile terminal 10, a network access provider (NAP) 100 that owns and operates the network, one or more network service providers (e.g., home NSP 200 and visited NSP 220) that may coordinate subscriptions and provide service to subscribers, and an application service provider (ASP) 250 that may provide application services. The NAP may include one or more ASNs that may be in communication with each other via an interface defined by a reference point R4 between the various ASNs including, for example, ASN 110 and other ASNs.

As shown in FIG. 2, each of the home NSP 200 and visited NSP 220 may include a respective connectivity service network (CSN) (e.g., visited CSN 202 and home CSN 222, respectively) that may be in communication with the ASP 300 network or the Internet. The visited CSN 202 and the home CSN 222 may be in communication with each other via an interface defined by the R5 reference point used for internetworking between home and visited networks. The visited CSN 202 may be in communication with the ASN 110 via an interface defined by the R3 reference point, which may support authentication, authorization and accounting (AAA), policy enforcement, and mobility management capabilities as well as tunnel implementation between the ASN 110 and the visited CSN 202. The visited CSN 202 and the home CSN 222 may also be in communication with the mobile terminal 10 via an interface defined by the R2 reference point comprising a logical interface for authentication, authorization, IP host configuration and mobility management.

The ASN 110 may include one or more ASN gateways (e.g., ASN-GW 120) and one or more base stations (e.g., BS 130 and BS 140). The base stations (e.g., BS 130 and BS 140) may be in communication with the mobile terminal 10 via an interface defined by the R1 reference point, which may implement communications, for example, in accordance with IEEE 802.16e. The ASN-GW 120 may be in communication with the BS 130 and the BS 140 via an interface defined by the reference point R6. The reference point R6 may implement intra-ASN tunnels and may be used for control plane signaling. However, unlike the conventional case of FIG. 1, the reference point R6 of an exemplary embodiment may be configured to support IP multicast (IP-M) rather than just IP unicast transport.

Figure 3:
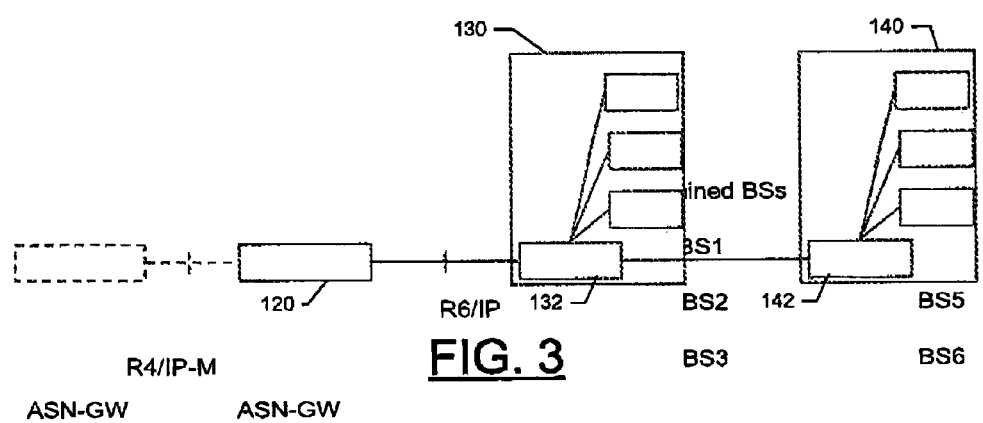
FIG. 3 is a schematic block diagram of an ASN architecture for utilizing an IP-multicast data path according to an exemplary embodiment of the present invention.

FIG. 3 is a schematic block diagram of an ASN architecture for utilizing an IP-multicast (IP-M) data path according to an exemplary embodiment of the present invention. In this regard, unlike the embodiment of FIG. 1, the ASN-GW 120 may be in communication with the BS 130 via an IP-M capable R6 interface. Accordingly, embodiments of the present invention may provide a data path that may allow IP-M to transport one flow across the last hop transport, which may be split to different sectors or base stations based on the physical topology of transport. In an exemplary embodiment, the BS 130 may include a router 132 for receiving the IP-M signaling from the ASN-GW 120 and distributing the IP-M data flow to the various sectors (BS1, BS2 and BS3) of the BS 130. If base stations are chained, as shown in FIG. 3, such that the ASN-GW is in communication with the BS 140 via the BS 130 (e.g., via an R8 interface), then the router 132 may also be in communication with router 142, which may distribute IP-M signals received to various sectors (BS4, BS5 and BS6) associated with the BS 140. Accordingly the routers 132 and 142 may each be any means or device embodied in hardware, software or a combination of hardware and software that is configured to distribute a single multicast flow received at a base station to other base stations or sectors.

An exemplary embodiment of the invention will now be described with reference to FIG. 4, in which certain elements of an apparatus for enabling the utilization of an IP-multicast data path according to an exemplary embodiment of the present invention are displayed. In this regard, the apparatus shown in FIG. 4 may be embodied, for example, at either the ASN-GW 120 or a base station (e.g., as the router or another portion thereof). It should be noted that while FIG. 4 illustrates one example of a configuration of an apparatus for enabling the utilization of an IP-multicast data path, numerous other configurations may also be used to implement embodiments of the present invention.

Figure 4:
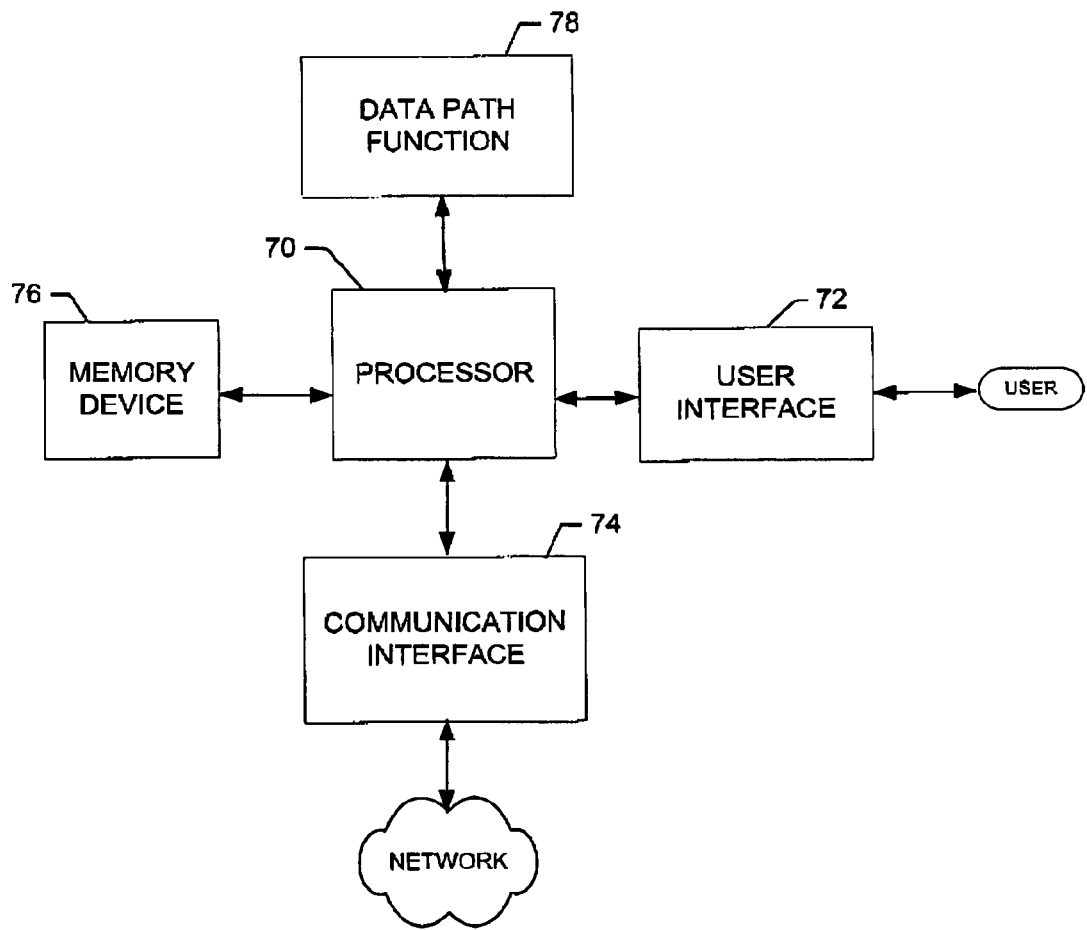
FIG. 4 is a block diagram of an apparatus for enabling the utilization of an IP-multicast data path according to an exemplary embodiment of the present invention.

Referring now to FIG. 4, an apparatus for enabling the utilization of an IP-multicast data path is provided. The apparatus may include or otherwise be in communication with a processor 70 (e.g., controller 20), a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit) or an FPGA (field programmable gate array). In an exemplary embodiment, the processor 70 may be configured to execute instructions stored in the memory device 76 or otherwise accessible to the processor 70. Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a touch screen display, a conventional display, a microphone, a speaker, or other input/output mechanisms. In an exemplary embodiment in which the apparatus is embodied as a server or some other network devices such as the ASN-GW 120 or the base stations (BS 130 and BS 140), the user interface 72 may be limited, or eliminated.

In an exemplary embodiment, the processor 70 may be embodied as or otherwise control a data path function 78. The data path function 78 may be any means such as a device or circuitry embodied in hardware, software or a combination of hardware and software that is configured to perform the corresponding functions of the data path function 78 as described herein. In this regard, the data path function 78 may be configured to enable the apparatus to join an IP-M tree. In particular, the data path function 78 of one of an ASN-GW and a base station may enable the corresponding ASN-GW or base station to join the same IP-M tree as the other of the ASN-GW and the base station in order to enable IP-M transport over the last hop from the ASN-GW to the base stations.

When embodied at an ASN-GW (e.g., ASN-GW 120), the data path function 78 may be configured to enable the ASN-GW to join the same IP-M tree as a base station (e.g., BS 130 or BS 140). The joining of the IP-M tree may be triggered either manually (e.g., by the user of the mobile terminal 10) or by an operations and management entity in the network. In some exemplary embodiments in which IP version four (IPv4) is utilized, Internet Group Management Protocol (IGMP)-join may be utilized for triggering the joining. Meanwhile, in other exemplary embodiments in which IP version six (IPv6) is utilized, Multicast Listener Discovery (MLD)-join may be used as the trigger. After joining the IP-M tree, the data path function 78 may enable the ASN-GW to select a GRE key for encapsulation with respect to tunneling between the ASN-GW and base station. In an exemplary embodiment, the GRE key may be selected from an MCBCS pool in order to set up an MCBCS flow. Notably, in unicast data path setup signaling, the ASN-GW may select the key for use in the uplink. However, in MCBCS, the uplink may not be needed and thus, uplink flow setup may be optional.

Figure 5:
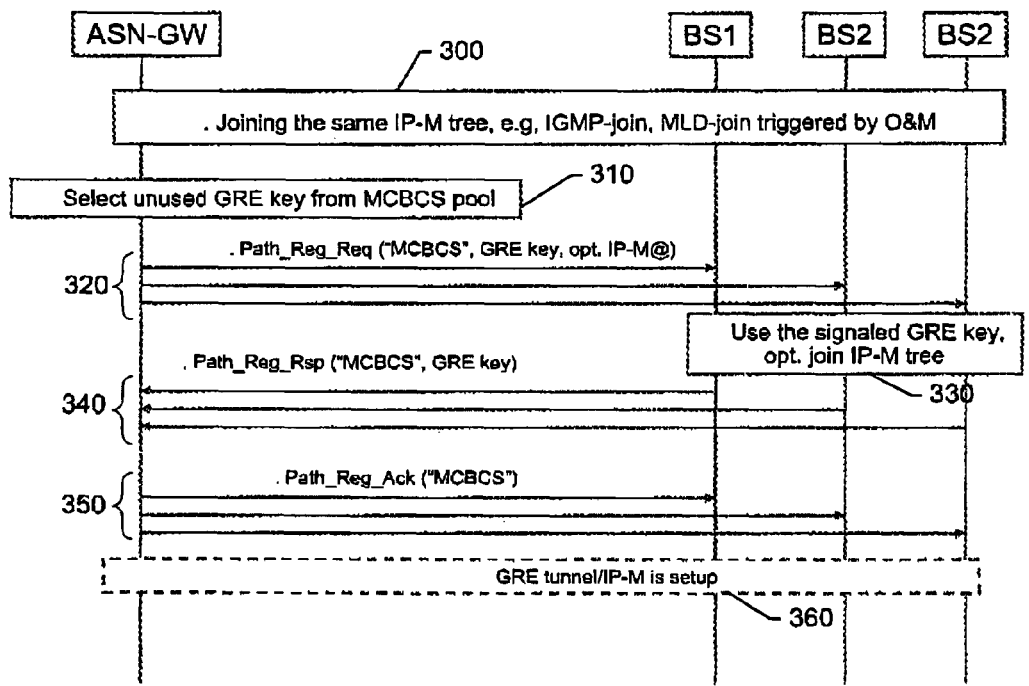
FIG. 5 is a communication flow diagram showing signaling for enabling the utilization of an IP-multicast data path according to an exemplary embodiment of the present invention.
Figure 6:
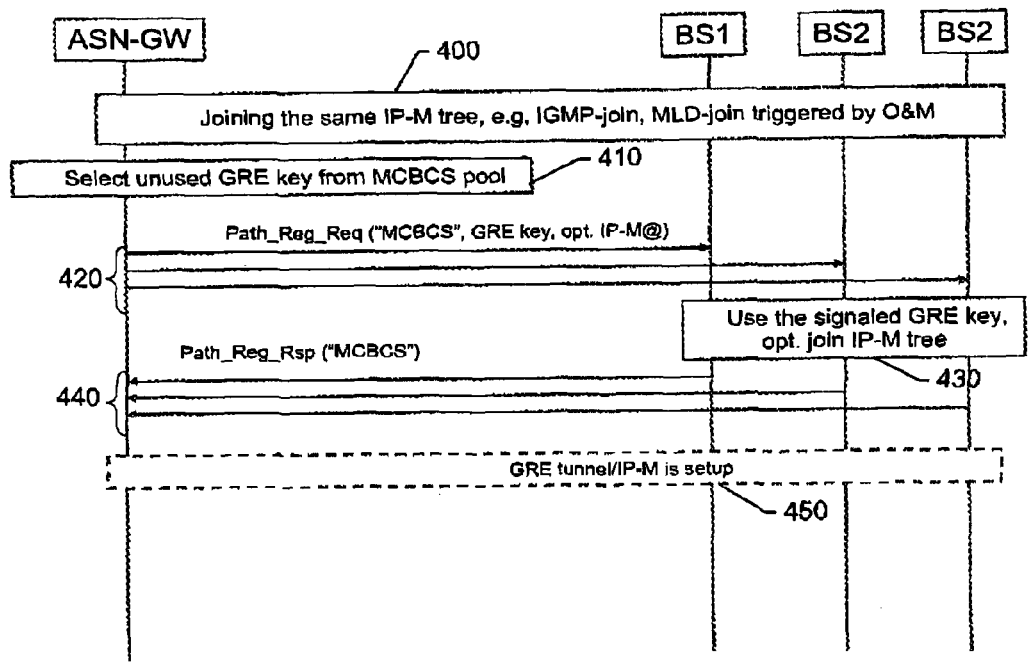
FIG. 6 is a communication flow diagram showing signaling for enabling the utilization of an IP-multicast data path according to another exemplary embodiment of the present invention.

After key selection, the ASN-GW may engage in signaling for continuing data path setup in which the data path may enable tunneling with IP-M transport. In some embodiments, the signaling may also be performed by the data path function 78 of the ASN-GW, but such signaling could alternatively be provided from another portion of the ASN-GW. FIGS. 5 and 6 illustrate further examples of such signaling.

In an exemplary embodiment in which the data path function 78 is embodied at a base station (e.g., BS 130 and/or BS 140), the data path function 78 may be configured to enable the base station to join the same IP-M tree as the ASN-GW. As indicated above, the joining of the IP-M tree may be triggered either manually or by an operations and management entity in the network using, for example, IGMP-join or MLD-join. After joining the IP-M tree, the data path function 78 may enable the base station to receive messaging from the ASN-GW including an identification of the GRE key for establishment of a downlink data path. In an exemplary embodiment, if the GRE key is selected from an MCBCS pool in order to set up an MCBCS flow, the data path function 78 may receive an indication of the MCBCS purpose of the flow and also receive an IP-M address. The IP-M address may enable the base station to join the IP-M tree if the base station has not yet joined the IP-M tree yet. Further signaling associated with IP-M data path setup for exemplary embodiments is illustrated, for example, in FIGS. 5 and 6.

FIG. 5 is a communication flow diagram showing signaling for enabling the utilization of an IP-multicast data path according to an exemplary embodiment of the present invention. In this regard, as shown in FIG. 5, base stations and their serving ASN-GW belonging to an MCBCS zone may join the same IP-M tree at the transport level at operation 300. The ASN-GW may then select a GRE key for the use in setting up MCBCS flow at operation 310. The ASN-GW may then send a signal (e.g., a Path_Req_Req signal) to all base stations in the MCBCS zone including the indication of the purpose of the message at operation 320 (e.g., data path setup for MCBCS services). The GRE key selected for the MCBCS data path and, in some cases, also the IP-M address to enable the base stations to join the IP-M tree if they have not already, may also be sent. At operation 330, base stations that have received the message of operation 320 may use the GRE key for establishment of a downlink MCBCS data path. If the base station was not yet a part of the IP-M tree, the base station can join the IP-M tree using the IP-M address received in operation 320. At operation 340, the base stations (e.g., BS1, BS2, BS3) may reply to the ASN-GW with a reply including the same GRE key as received in operation 320. The ASN-GW may acknowledge at operation 350 (e.g., with a Path_Req_Ack message) to set up a R6/R4 data path for MCBCS on top of IP-M at operation 360. The flow may be unidirectional (from ASN-GW to BSs) or optionally may be bi-directional. Moreover, as illustrated in FIG. 5, the flow may be setup using at least some of the signaling used in unicast setup to reduce the need for changes to current setup signaling.

The procedure above in FIG. 5 assumes that IP-M is used for R6/R4 transport. In this case, GRE keys can be reused between tunnels on top of IP-M and IP unicast in the ASN. If IP-unicast must be used for MCBCS transport between ASN-GW and BS, e.g., IP-M is not supported by the transport, part of the, e.g., GRE key address space (i.e., 4 octets) may be reserved for MCBCS data paths to allow the ASN-GW to select the key in the downlink as used in the above procedure.

The reservation of the GRE key space can be done by preconfiguration of WiMAX network elements.

In some embodiments, there may be no need for the three-way signaling shown in FIG. 5, which may result in both uplink and downlink IP-M transport. In this regard, FIG. 6 illustrates an embodiment that may take advantage of the fact that ASN-GW selects GRE key for the downlink and there may be no need for three-way signaling. Instead, as shown in FIG. 6, two-way signaling may be sufficient in situations in which the GRE key is signaled to the base stations from the ASN-GW and a confirmation is sent back as shown below.

FIG. 6 is a communication flow diagram showing signaling for enabling the utilization of an IP-multicast data path according to another exemplary embodiment of the present invention. In this regard, the exemplary embodiment of FIG. 6 may include operations 400, 410, 420 and 430, which may be substantially similar to operations 300, 310, 320 and 330, respectively, of the embodiment of FIG. 5. However, since IP-M may not be used for the uplink, the uplink may be unicast and operation 440 may merely involve an acknowledgement by the base stations of the data path (e.g., using a Path_Res_Resp message). After operation 440, R6/R4 flow for MCBCS on top of IP-M may be set up in which the flow may be unidirectional or bi-directional at operation 450 as described above.

Accordingly, embodiments of the present invention may provide setting up of a MCBCS R6/R4 data path using IP multicast transport. Moreover, embodiments may provide for reusing existing unicast setup signalling with relatively minimal changes and a simplified setup signaling procedure for MCBCS service provision. In an exemplary embodiment, there may be no need for setting up matching uplink and downlink pairs of data paths (since the uplink may not be used for MCBCS). In some embodiments in which IP unicast is used for transport, reservation of GRE key addressing space may be provided for MCBCS to allow the ASN-GW to select the GRE key used by the base station in the uplink.

Figure 7:
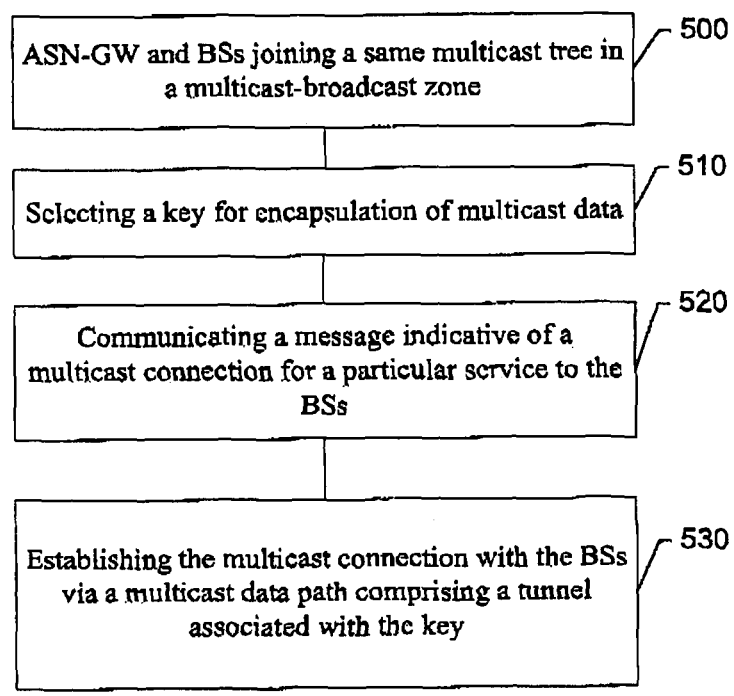
FIG. 7 is a flowchart according to an exemplary method of providing an IP-multicast data path according to one embodiment of the present invention.
Figure 8:
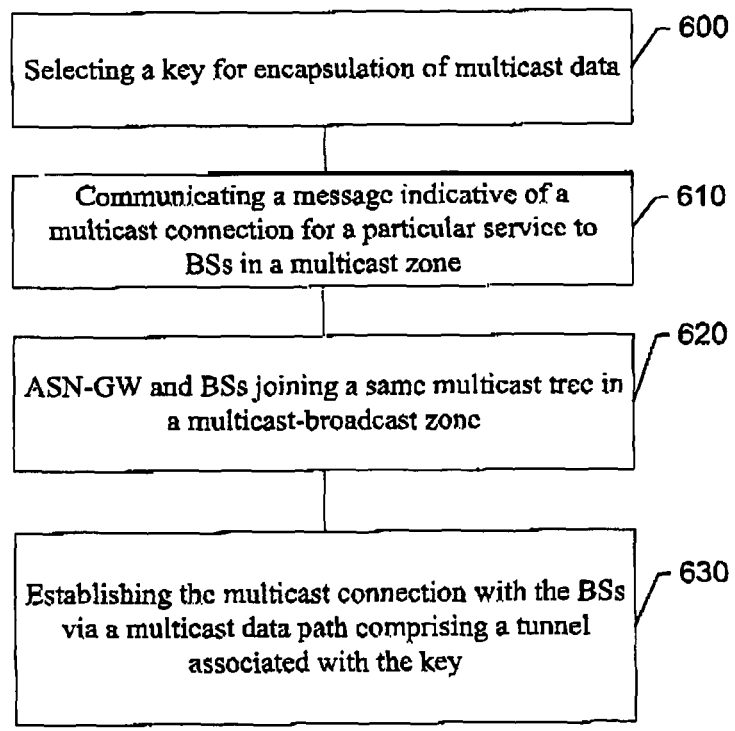
FIG. 8 is a flowchart according to another exemplary method of providing an IP-multicast data path according to an exemplary embodiment of the present invention.

FIGS. 7 and 8 are flowcharts according to an exemplary method of providing an IP-multicast data path according to one embodiment of the present invention. As such, FIGS. 7 and 8 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing an IP-multicast data path, which may be referenced to the point of view of an ASN-GW, as shown in FIG. 7, may include joining a same multicast tree as base stations in a broadcast-multicast zone at operation 500. The multicast tree may be an IP multicast tree. Accordingly, for example, both an ASN-GW and the base stations in a broadcast-multicast zone may join the same IP-multicast tree. At operation 510 a key for encapsulation of multicast data may be selected. The key may be a GRE key. The method may further include communicating a message indicative of a multicast connection for a particular service to the base station at operation 520 and establishing the multicast connection with the base station via a multicast data path comprising a tunnel associated with the key at operation 530.

In an exemplary embodiment, communicating the message indicative of the multicast connection for a particular service may include communicating a message indicative the multicast connection for a multicast and broadcast service (MCBCS). In such a case, selecting the key may include selecting a generic routing encapsulation key from a MCBCS pool. In some embodiments, communicating the message may further include communicating the message including the key or communicating the message including an Internet Protocol multicast address. In some embodiments, IP-multicast may only be used for downlink communications, while unicast may be used for uplink communications.

Rather than joining the multicast tree prior to key selection, an alternative exemplary embodiment as shown in FIG. 8 may provide for key selection as an initial operation of operation 600. A message indicative of a multicast connection for a particular service may then be communicated to the base station at operation 610 and the ASN-GW and the base stations in a broadcast-multicast zone may join the same IP-multicast tree at operation 620. In some cases, the message may provide a multicast address for enabling the joining of the multicast tree. The multicast connection with the base stations via a multicast data path comprising a tunnel associated with the key may then be established at operation 630.

Figure 9:
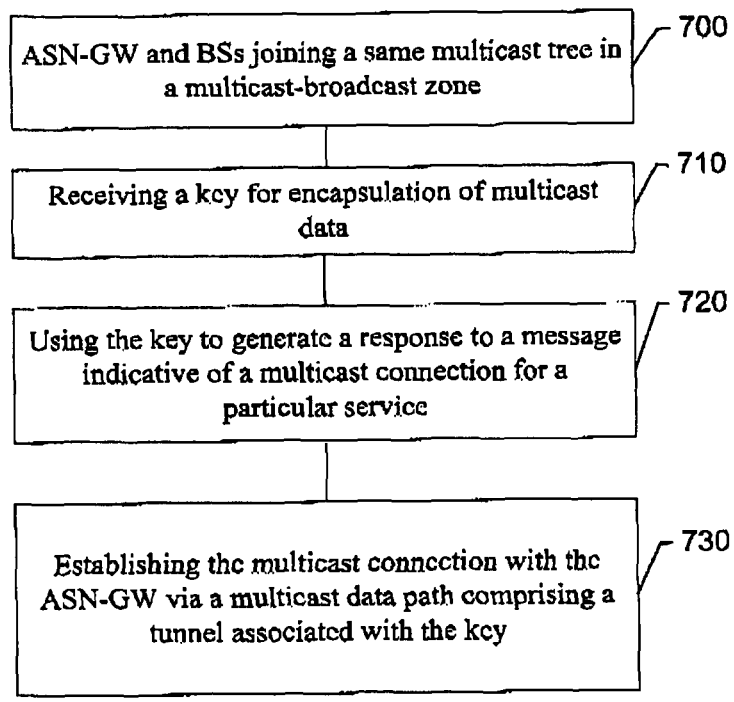
FIG. 9 is a flowchart according to yet another exemplary method of providing an IP-multicast data path according to one embodiment of the present invention.

Alternatively, an exemplary embodiment of a method of providing an IP-multicast data path from the perspective of base stations in a particular broadcast-multicast zone, as shown in FIG. 9, may include joining a same multicast tree as an ASN-GW at operation 700. The multicast tree may be an IP multicast tree. Accordingly, for example, both an ASN-GW and the base stations in a broadcast-multicast zone may join the same IP-multicast tree. At operation 710 a key for encapsulation of multicast data may be received. The key may be a GRE key. The method may further include using the key to generate a response to a message indicative of a multicast connection for a particular service at operation 720 and establishing the multicast connection with the ASN-GW via a multicast data path comprising a tunnel associated with the key at operation 730.

Figure 10:
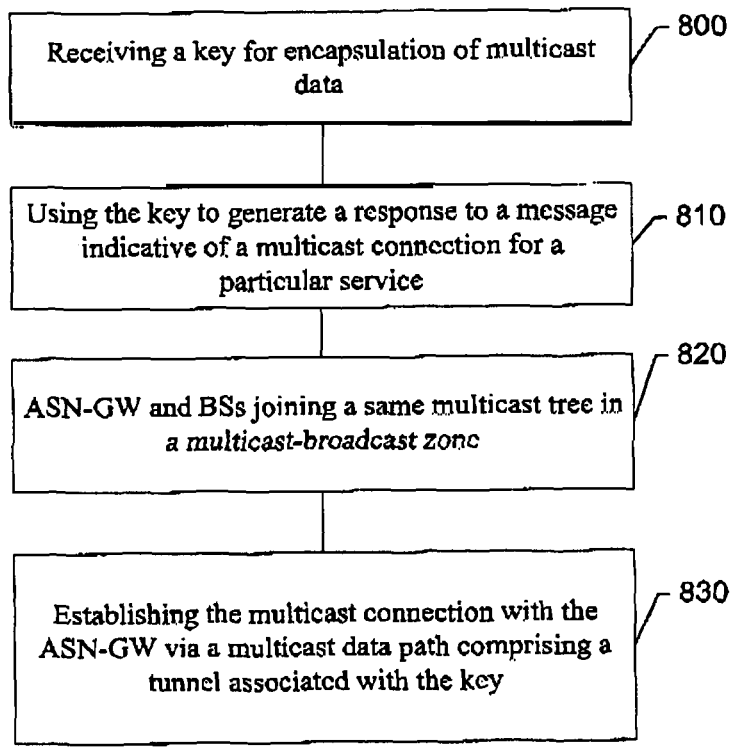
FIG. 10 is a flowchart according to still another exemplary method of providing an IP-multicast data path according to one embodiment of the present invention.

Rather than joining the multicast tree prior to key selection, an alternative exemplary embodiment as shown in FIG. 10 may provide for receipt of a selected key at operation 800. A response to a message indicative of a multicast connection for a particular service may then be generated at operation 810 and the ASN-GW and the base stations in a broadcast-multicast zone may join the same IP-multicast tree at operation 820. In some cases, the message may provide a multicast address for enabling the joining of the multicast tree. The multicast connection with the base stations via a multicast data path comprising a tunnel associated with the key may then be established at operation 830.

In an exemplary embodiment, the message indicative of the multicast connection for a particular service may be a message indicative the multicast connection for a multicast and broadcast service (MCBCS). As indicated above, the key may be selected as a generic routing encapsulation key from a MCBCS pool. In some embodiments, the key and an Internet Protocol multicast address may be received along with the message. In some embodiments, IP-multicast may only be used for downlink communications, while unicast may be used for uplink communications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
   at least one processor; and
   at least one memory including computer program code,
   the at least one memory and computer program code configured to, with the at least one processor, cause the apparatus to perform at least the following:
   select a key for encapsulation of multicast data at a gateway device;
   communicate a single message indicative of a multicast connection for a particular service from the gateway device to a first base station in a multicast-broadcast zone, wherein one or more second base stations are connected thereto such that the first base station is configured to communicate the single message to the one or more second base stations, the one or more second base stations being joined to a same multicast tree in the multicast-broadcast zone as the gateway device; and
   establish the multicast connection with the base stations via a multicast data path comprising a multicast tunnel associated with the key.

2. The apparatus of claim 1, wherein the message comprises a path registration request.

3. The apparatus of claim 1, wherein the processor is configured to select the key by selecting a generic routing encapsulation key from a multicast and broadcast service pool.

4. The apparatus of claim 1, wherein the processor is configured to communicate the message by communicating the message including the key or an internet protocol multicast address.

5. The apparatus of claim 1, wherein the processor is further configured to utilize internet protocol multicast for downlink communication.

6. A method comprising:
   selecting, via a processor, a key for encapsulation of multicast data at a gateway device;
   communicating a single message indicative of a multicast connection for a particular service from the gateway device to a first base station in a multicast-broadcast zone, wherein one or more second base stations are connected thereto such that the first base station is configured to communicate the single message to the one or more second base stations, the one or more second base stations being joined to a same multicast tree in the multicast-broadcast zone as the gateway device; and
   establishing the multicast connection with the base stations via a multicast data path comprising a multicast tunnel associated with the key.

7. The method of claim 6, wherein selecting the key comprises selecting a generic routing encapsulation key from a multicast and broadcast service pool.

8. The method of claim 6, wherein communicating the message further comprises communicating the message including the key or an internet protocol multicast address.

9. The method of claim 6, further comprising utilizing internet protocol multicast for downlink communication.

10. A computer program product comprising at least one non-transitory computer-readable storage medium having computer-executable program code instructions stored therein, the computer-executable program code instructions comprising:
    program code instructions for selecting a key for encapsulation of multicast data at a gateway device;
    program code instructions for communicating a single message indicative of a multicast connection for a particular service from the gateway device to a first base station in a multicast-broadcast zone, wherein one or more second base stations are connected thereto such that the first base station is configured to communicate the single message to the one or more second base stations, the one or more second base stations being joined to a same multicast tree in the multicast-broadcast zone as the gateway device; and
    program code instructions for establishing the multicast connection with the base stations via a multicast data path comprising a multicast tunnel associated with the key.

* * * * *